US012321902B2

(12) United States Patent
Matsushita et al.

(10) Patent No.: US 12,321,902 B2
(45) Date of Patent: Jun. 3, 2025

(54) MANAGEMENT APPARATUS, MANAGEMENT METHOD, AND NON-TRANSITORY COMPUTER READABLE MEDIUM

(71) Applicant: TOYOTA JIDOSHA KABUSHIKI KAISHA, Toyota (JP)

(72) Inventors: Makoto Matsushita, Ichinomiya (JP); Hiroe Fukui, Toyohashi (JP); Naoki Uenoyama, Kasugai (JP); Hikaru Gotoh, Nagoya (JP); Satoshi Komamine, Nagoya (JP); Takanori Sasano, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 383 days.

(21) Appl. No.: 18/081,881

(22) Filed: Dec. 15, 2022

(65) Prior Publication Data

US 2023/0196491 A1 Jun. 22, 2023

(30) Foreign Application Priority Data

Dec. 16, 2021 (JP) ................. 2021-204588

(51) Int. Cl.
*G06Q 30/00* (2023.01)
*G06Q 10/08* (2024.01)
(Continued)

(52) U.S. Cl.
CPC ............ *G06Q 10/20* (2013.01); *G06Q 10/08* (2013.01); *G07C 5/0808* (2013.01); *G06Q 10/083* (2013.01)

(58) Field of Classification Search
None
See application file for complete search history.

(56) References Cited

U.S. PATENT DOCUMENTS

2003/0102969 A1* 6/2003 Parsons ................ B62B 3/1404
340/568.5
2003/0139665 A1* 7/2003 Takayama ............. G16H 40/20
600/407

(Continued)

FOREIGN PATENT DOCUMENTS

| JP | 2006-264530 A | 10/2006 |
| JP | 2020-017207 A | 1/2020 |
| JP | 2021-062968 A | 4/2021 |

OTHER PUBLICATIONS

Port truck scheduling on a dedicated transportation route at a container terminal, Zheng, Feifeng; Huang, Jidan; Liu, Ming; Chu, Feng. CIE 2016: 46th, International Conferences on Computers and Industrial, EngineeringComputers and Industrial Engineering. (2016) (Year: 2016).*

(Continued)

*Primary Examiner* — Matthew T Sittner
(74) *Attorney, Agent, or Firm* — Dinsmore & Shohl LLP

(57) ABSTRACT

A management apparatus includes a controller that manages mobile objects that deliver articles. The controller determines and outputs a plan for maintenance of at least one target mobile object, which is a mobile object that is out for delivery among the mobile objects and is in a problematic state for delivery, based on information about the target mobile object.

16 Claims, 3 Drawing Sheets

(51) Int. Cl.
  *G06Q 10/20*  (2023.01)
  *G07C 5/08*  (2006.01)
  *G06Q 10/083*  (2024.01)

(56) References Cited

U.S. PATENT DOCUMENTS

| | | | | |
|---|---|---|---|---|
| 2017/0004429 | A1* | 1/2017 | Maenishi | G05B 19/4188 |
| 2018/0189750 | A1* | 7/2018 | Nonaka | G06T 7/0004 |
| 2018/0284807 | A1* | 10/2018 | Wood | G06Q 10/047 |
| 2021/0116924 | A1 | 4/2021 | Etou et al. | |
| 2021/0308867 | A1 | 10/2021 | Kikkawa | |
| 2021/0325888 | A1* | 10/2021 | Mandel-Senft | B60K 35/60 |
| 2022/0261747 | A1* | 8/2022 | Schubert | G06Q 10/087 |
| 2023/0144456 | A1* | 5/2023 | Ferguson | G06Q 20/401 |
| | | | | 705/26.81 |

OTHER PUBLICATIONS

Vehicle scheduling under the warehouse-on-wheels policy, Fliednera, Malte; Briskornb, Dirk; Boysenc, Nils. Discrete Applied, Mathematics 205: 52-61. Elsevier B.V., The Boulevard Kidlington Oxford OX5 1GB, United Kingdom. (May 31, 2016) (Year: 2016).*

A Neighborhood Search for a Multi-size Container Transportation Problem, Funke, Julia; Kopfer, Herbert. IFAC-PapersOnLine 48.3: 2041-2046. Elsevier B.V., (2015) (Year: 2015).*

The Generalized Rollon-Rolloff Vehicle Routing Problem and Savings-Based Algorithm, Li, Hongqi; Jian, Xiaorong; Chang, Xinyu; Lu, Yingrong. Transportation Research: Part B: Methodological 113: 1-23. (July 2018) (Year: 2018).*

* cited by examiner

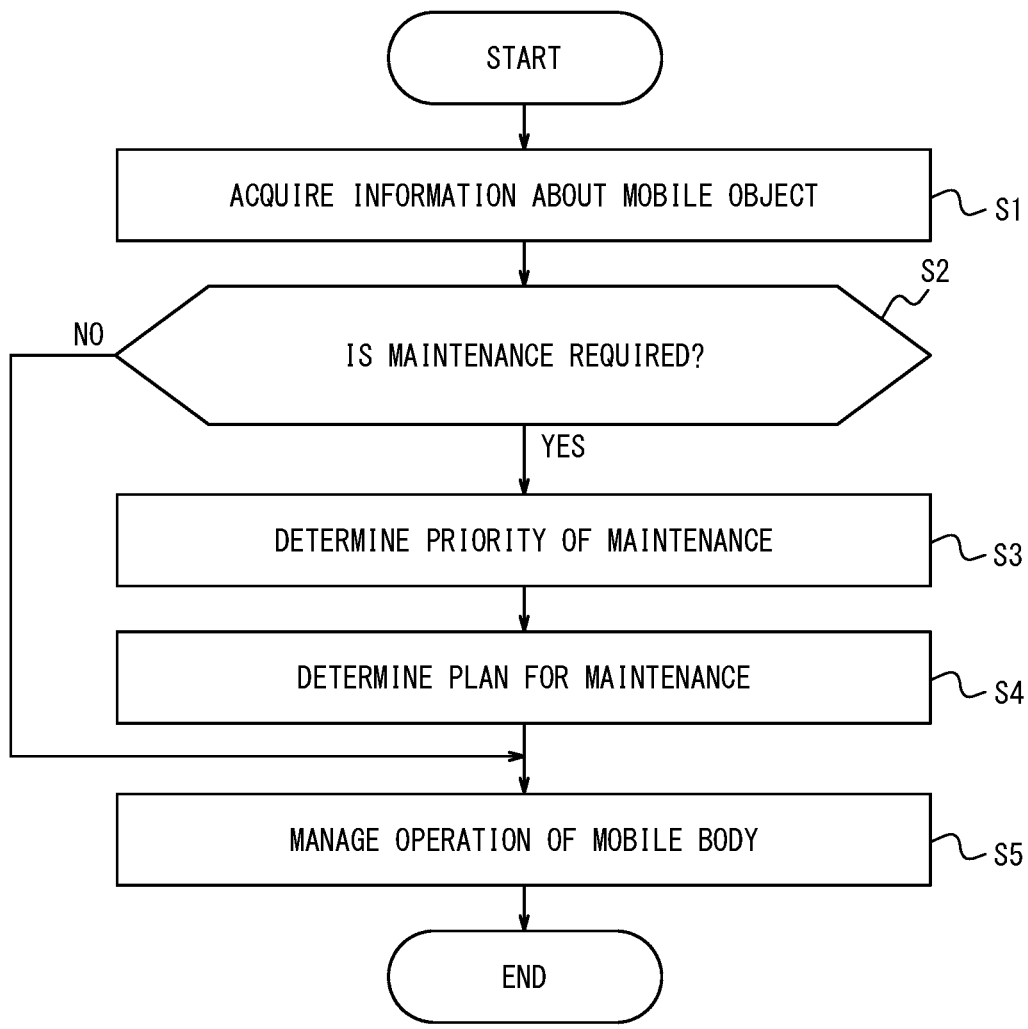

MANAGEMENT APPARATUS, MANAGEMENT METHOD, AND NON-TRANSITORY COMPUTER READABLE MEDIUM

CROSS-REFERENCE TO RELATED APPLICATION

This application claims priority to Japanese Patent Application No. 2021-204588, filed on Dec. 16, 2021, the entire contents of which are incorporated herein by reference.

TECHNICAL FIELD

This disclosure relates to a management apparatus, a management method, and a non-transitory computer readable medium for a mobile object.

BACKGROUND

A method for quickly transporting a container yard's on-site chassis to a repair shop or other facility in the case of the chassis breaking down is known. For example, see Patent Literature (PTL) 1.

CITATION LIST

Patent Literature

PTL 1: JP 2006-264530 A

SUMMARY

In the case of a plurality of mobile objects requiring maintenance, the maintenance schedule for the mobile objects can have a significant impact on delivery by the mobile objects. The increased impact on delivery by the mobile objects may reduce the convenience for users who ship and receive articles.

It would be helpful to improve user convenience.

A management apparatus according to an embodiment of the present disclosure includes a controller that manages mobile objects that deliver articles. The controller determines and outputs a plan for maintenance of at least one target mobile object, which is a mobile object that is out for delivery among the mobile objects and is in a problematic state for delivery, based on information about the target mobile object.

A management method according to an embodiment of the present disclosure is performed by a management apparatus configured to manage mobile objects that deliver articles. The management method includes determining and outputting a plan for maintenance of at least one target mobile object, which is a mobile object that is out for delivery among the mobile objects and is in a problematic state for delivery, based on information about the target mobile object.

A non-transitory computer readable medium according to an embodiment of the present disclosure stores a management program to be executed by a management apparatus that manages mobile objects that deliver articles. The management program is configured to cause the management apparatus to determine and output a plan for maintenance of at least one target mobile object, which is a mobile object that is out for delivery among the mobile objects and is in a problematic state for delivery, based on information about the target mobile object.

According to a management apparatus, a management method, and a non-transitory computer readable medium for a mobile object according to an embodiment of the present disclosure, user convenience can be improved.

BRIEF DESCRIPTION OF THE DRAWINGS

In the accompanying drawings:

FIG. 3 is a flowchart illustrating an example procedure of a management method according to an embodiment.

DETAILED DESCRIPTION (Example Configuration of Management System 1)

Figure 1:
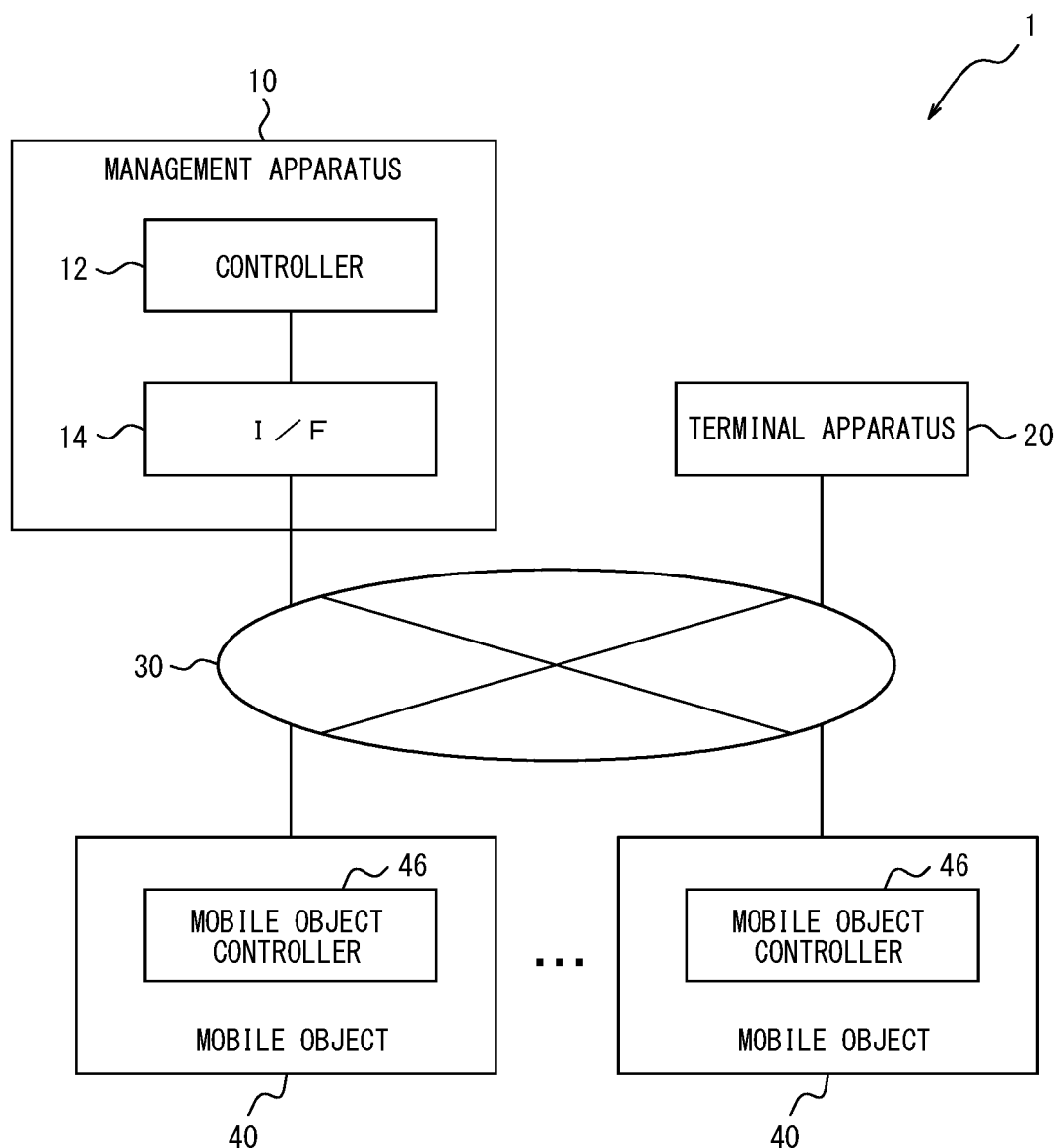
FIG. 1 is a block diagram illustrating an example configuration of a management system according to an embodiment.

As illustrated in FIG. 1, a management system 1 according to an embodiment includes a management apparatus 10 and mobile objects 40. The management system 1 further includes, but is not required to include, a terminal apparatus 20.

<Management Apparatus 10>

The management apparatus 10 manages the operation of the mobile objects 40. The management apparatus 10 includes a controller 12 and an interface 14. The interface 14 is also referred to as an I/F 14.

The controller 12 controls at least one component of the management apparatus 10. The controller 12 may be configured to include at least one processor. The "processor" is a general purpose processor, a dedicated processor specialized for specific processing, or the like in the present embodiment but is not limited to these. The controller 12 may be configured to include at least one dedicated circuit. The dedicated circuit may include, for example, a field-programmable gate array (FPGA) or an application specific integrated circuit (ASIC). The controller 12 may be configured with the dedicated circuit instead of the processor, or may be configured with the dedicated circuit along with the processor.

The management apparatus 10 may further include a memory. The memory is a semiconductor memory, a magnetic memory, an optical memory, or the like, for example, but is not limited to these. The memory may function, for example, as a main memory, an auxiliary memory, or a cache memory. The memory may include an electromagnetic storage medium, such as a magnetic disk. The memory may include a non-transitory computer readable medium. The memory stores any information used for operation of the management apparatus 10. For example, the memory may store a system program, an application program, or the like. The memory may be included in the controller 12.

Information, data, or the like is outputted from and inputted to the controller 12 through the I/F 14. The I/F 14 may include a communication module for communication with other apparatuses, such as the mobile object 40 or the terminal apparatus 20, via a network 30. The communication module may be, for example, compliant with a mobile communication standard such as the 4th Generation (4G) standard or the 5th Generation (5G) standard. The communication module may be compliant with a communication standard such as a Local Area Network (LAN). The communication module may be compliant with a wired or wireless communication standard. The communication module is not limited to these examples and may be compliant with various communication standards. The I/F 14 may be configured to be connected to the communication module.

The I/F 14 may be configured with an input device for receiving inputs, such as information or data, from a user. The input device may be configured with, for example, a touch panel, a touch sensor, or a pointing device such as a mouse. The input device may be configured with a physical key. The input device may be configured with an audio input device, such as a microphone.

The I/F 14 may be configured to include an output device that outputs information, data, or the like to the user. The output device may include, for example, a display device that outputs visual information, such as images, letters, or graphics. The display device may be configured with, for example, a Liquid Crystal Display (LCD), an organic or inorganic Electro-Luminescent (EL) display, a Plasma Display Panel (PDP), or the like. The display device is not limited to the above displays and may be configured with various other types of displays. The display device may be configured with a light emitting device, such as a Light Emitting Diode (LED) or a Laser Diode (LD). The display device may be configured with various other devices. The output device may include, for example, an audio output device, such as a speaker, that outputs audio information, such as voice. The output device is not limited to the above examples and may include various other devices.

The management apparatus 10 may include a single server apparatus, or multiple server apparatuses capable of communicating with each other.

<Mobile Object 40>

Figure 2:
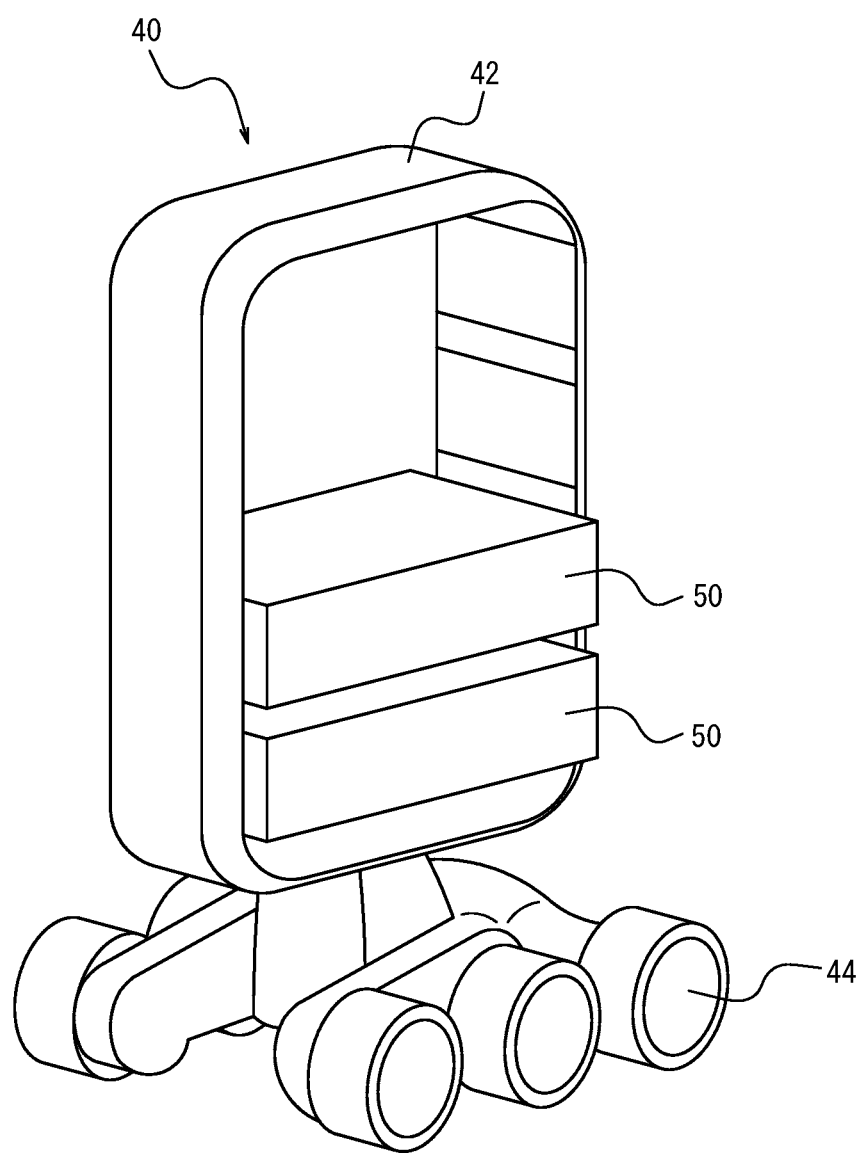
FIG. 2 is a diagram schematically illustrating an example configuration of a mobile object.

As illustrated in FIG. 2, the mobile object 40 includes a body 42 with a storage space for storing delivery articles 50, which are items to be delivered, and a drive unit 44 for moving the mobile object 40. The storage space of the body 42 may be configured to store delivery articles 50 packed in delivery boxes or the like or may be configured to store delivery articles 50 that are not packed in delivery boxes or the like. The body 42 may be equipped with a locking mechanism configured to lock the delivery articles 50 stored in the storage space. The drive unit 44 may, for example, include wheels or caterpillars as a mechanism for traveling on a road surface. The drive unit 44 may further include a drive mechanism such as a motor or engine that drives the wheels, caterpillars, or the like. The drive unit 44 may further include components such as gears that transmit power from the drive mechanism to the wheels, caterpillars, or the like. The drive unit 44 may further include a battery to supply power or a tank to supply fuel to the drive mechanism.

As illustrated in FIG. 1, in some embodiments, the mobile object 40 further includes a mobile object controller 46. The mobile object controller 46 controls at least one component of the mobile object 40, such as the body 42 or drive unit 44 of the mobile object 40. The mobile object controller 46 may acquire destination information specifying a destination from the management apparatus 10 and control the drive unit 44 to travel autonomously based on the destination information. The mobile object 40 may acquire control information indicating the timing at which to start or stop traveling, the travel speed, or the like from the management apparatus 10 and control the drive unit 44 to travel based on the control information. In a case in which a delivery article 50 is stored in the body 42, the mobile object controller 46 may output information identifying the stored delivery article 50 to the management apparatus 10. In a case in which a delivery article 50 is removed from the body 42, the mobile object controller 46 may output information identifying the removed delivery article 50 to the management apparatus 10.

The mobile object controller 46 may be configured to include at least one processor. The mobile object controller 46 may be configured to include one or more dedicated circuits instead of the processor, or may be configured to include a dedicated circuit along with the processor. The mobile object 40 may be configured to include a memory. The memory of the mobile object 40 may be configured to be identical or similar to the memory of the management apparatus 10. The mobile object 40 may be configured to include an I/F or a communication module. The I/F or communication module of the mobile object 40 may be configured to be identical or similar to the I/F or communication module of the management apparatus 10.

The mobile object 40 may be configured to include a positional information detector that acquires the positional information for the mobile object 40 itself. The mobile object 40 may output the positional information for the mobile object 40 itself to the management apparatus 10. The positional information detector may be configured to include a receiver compliant with a satellite positioning system. The receiver compliant with the satellite positioning system may include, for example, a Global Positioning System (GPS) receiver.

The number of mobile objects 40 managed by the management system 1 may be two or more. The mobile object 40 is not limited to the configuration illustrated in FIG. 2 but may be configured in a variety of other ways to store the delivery article 50 and move.

The mobile object controller 46 may acquire detection results regarding the state of the mobile object 40 from various sensors installed in the mobile object 40. The mobile object controller 46 may acquire the state of the mobile object 40 based on sensor detection results. The mobile object controller 46 may estimate the state of the mobile object 40. The mobile object controller 46 may, for example, estimate whether the mobile object 40 is ready to travel as the state of the mobile object 40. The mobile object controller 46 may estimate whether the mobile object 40 is dirty or wet as the state of the mobile object 40. The mobile object controller 46 may estimate whether at least a portion of the components of the mobile object 40 has failed as the state of the mobile object 40. The mobile object controller 46 may output information representing the state of the mobile object 40 to the management apparatus 10.

The information representing the state of the mobile object 40 includes information indicating that the mobile object 40 is in a state requiring maintenance. The mobile object 40 can require maintenance in states such as damage or inoperability of the body 42 or drive unit 44, or a low battery state of charge or low fuel.

The mobile object controller 46 may determine that the mobile object 40 is in a state requiring maintenance in a case in which the mobile object 40 is unable to move normally from its location and cannot deliver the delivery article 50 that is being delivered. The mobile object controller 46 may determine that the mobile object 40 is in a state requiring maintenance in a case in which, for example, the mobile object 40 is stopped, the travel speed of the mobile object 40 is a predetermined rate less than the normal speed, or traveling places the mobile object 40 in a dangerous state. The mobile object controller 46 may determine that the mobile object 40 is in a state requiring maintenance in a case in which the remaining battery level or fuel level in the mobile object 40 is equal to or less than a predetermined amount. The mobile object controller 46 may determine whether the mobile object 40 is in a state requiring maintenance based on various states of the mobile object 40. A mobile object 40 that is out for delivery of a delivery article 50 and is in a state that is problematic for delivery of the delivery article 50 is also referred to as a target mobile object. Here, the mobile object 40 being out for delivery may include a state in which the mobile object 40 is traveling toward the delivery destination after storing the delivery article 50 or is delivering the delivery article 50 to the user after arriving at the delivery destination. The mobile object 40 being out for delivery may include a state in which the mobile object 40 is returning after having completed delivery of the delivery article 50 or is traveling toward the delivery source to retrieve the delivery article 50.

In a case in which the mobile object 40 is in a state requiring maintenance, the following tasks, for example, may be performed to maintain the mobile object 40. A worker, equipment, other mobile object 40, or the like performing maintenance may move to the location of the mobile object 40 targeted for maintenance due to being immobile or slow and perform maintenance such as repairs, part replacement, or charging or refueling of the mobile object 40 targeted for maintenance. Equipment, another mobile object 40, or the like that retrieves the mobile object 40 targeted for maintenance may move to the location of the mobile object 40 targeted for maintenance to retrieve and transport the mobile object 40 targeted for maintenance to a facility for performing maintenance. In a case in which the mobile object 40 targeted for maintenance is retrieved, another substitute mobile object 40 may retrieve and deliver the delivery articles 50 stored in the mobile object 40 targeted for maintenance.

<Terminal Apparatus 20>

The terminal apparatus 20 may accept input of information, from the user who ships the delivery article 50, specifying the place or time to ship the delivery article 50 and may output the inputted information to the management apparatus 10. The terminal apparatus 20 may accept input of information, from the user who receives the delivery article 50, specifying the place or time to receive the delivery article 50 and may output the inputted information to the management apparatus 10. The terminal apparatus 20 may acquire information about the delivery status of the delivery article 50 from the management apparatus 10 and notify the user who shipped the delivery article 50 or the user who is to receive the delivery article 50 of the delivery status.

The terminal apparatus 20 may be configured to include one or more processors or one or more dedicated circuits. The terminal apparatus 20 may be configured to include a memory. The memory of the terminal apparatus 20 may be configured to be identical or similar to the memory of the management apparatus 10. The terminal apparatus 20 may be configured to include an I/F or a communication module. The I/F or communication module of the terminal apparatus 20 may be configured to be identical or similar to the I/F or communication module of the management apparatus 10.

The terminal apparatus 20 may be configured to include an input device for receiving inputs, such as information or data, from the user. The input device may be configured to include the various devices described as the I/F 14. The terminal apparatus 20 may be configured to include an output device that outputs information, data, or the like to the user. The output device may be configured to include the various devices described as the I/F 14.

The number of terminal apparatuses 20 included in the management system 1 is not limited to one and may be two or more. The terminal apparatus 20 may be configured as a mobile terminal, such as a smartphone or a tablet, or a Personal Computer (PC), such as a notebook PC or a tablet PC. The terminal apparatus 20 is not limited to the above examples and may be configured as various devices.

(Operation Example of Management System 1)

In the management system 1 according to the present embodiment, the management apparatus 10 manages the operation of each mobile object 40 in the plurality of mobile objects 40. The management apparatus 10 manages the operation of the mobile object 40 so that the mobile object 40 stores the delivery article 50 at the delivery source and delivers the delivery article 50 to the delivery destination. In a case in which the mobile object 40 is not storing any delivery articles 50 or has the capacity to store another delivery article 50, the management apparatus 10 designates the delivery source of the delivery article 50 as the destination of the mobile object 40 so that the mobile object 40 stores the delivery article 50. In a case in which the mobile object 40 has stored the delivery article 50, the management apparatus 10 designates the delivery destination of the delivery article 50 as the destination of the mobile object 40 so that the mobile object 40 delivers the stored delivery article 50.

The delivery source includes the location from which the delivery article 50 is shipped. The delivery article 50 may be shipped from the user, such as a corporation or individual, or from a distribution center or the like that has collected the delivery article 50. The delivery destination includes the location at which the delivery article 50 is to be received. The delivery article 50 may be received by a user, such as a corporation or individual, or by a distribution center or the like that collects the delivery article 50. These examples are not limiting, and the delivery source or destination may include a variety of locations. The management apparatus 10 plans and manages the operation of the mobile objects 40 so that the number of delivery articles 50 handled for pickup or delivery increases.

The greater the number of mobile objects 40 in operation, the more delivery articles 50 can be handled. Also, the longer each mobile object 40 operates, the more delivery articles 50 can be handled. In other words, the higher the utilization rate of the mobile objects 40, the more delivery articles 50 can be handled. The management apparatus 10 manages the operation of the mobile objects 40 so as to increase the utilization rate of the mobile objects 40.

The management apparatus 10 manages the state of the mobile object 40 in order to manage the operation of the mobile object 40. The state of the mobile object 40 includes whether the mobile object 40 is in a state requiring maintenance. The state of the mobile object 40 may include the number, weight, or type of the delivery articles 50 stored in the mobile object 40, the delivery location, the delivery time, or the like.

In a case in which a mobile object 40 is in a state requiring maintenance, the management apparatus 10 determines a plan for maintenance of the mobile object 40 (target mobile object). Performance of maintenance on the target mobile object reduces the utilization rate of the mobile object 40. The management apparatus 10 may determine the plan for maintenance of the target mobile object so that the utilization rate of the mobile object 40 is maintained or increased. Specifically, the management apparatus 10 may determine the plan for maintenance of the target mobile object so that the number of mobile objects 40 operating simultaneously increases. The management apparatus 10 may also determine a plan for maintenance of the target mobile object so as to reduce the downtime of a target mobile object that has stopped while storing a delivery article 50. In this way, the time required to deliver or collect the delivery article 50 can be reduced. As a result, the user's requirements for handling of the delivery article 50, such as delivery or collection, are more easily met.

A plurality of mobile objects 40 can be targeted for maintenance at different times. A plurality of mobile objects 40 can also be targeted for maintenance at the same time. The periods when a plurality of mobile objects 40 are targeted for maintenance can therefore overlap. In other words, there can be a period of time when a plurality of mobile objects 40 are target mobile objects. The amount of equipment or number of workers performing maintenance on the mobile objects 40 is limited. As a result, the number of target mobile objects at a given point in time might be less than the number on which maintenance can be performed with resources such as equipment or workers who simultaneously perform maintenance on the target mobile objects in the management system 1. When the number of target mobile objects is greater than the number on which maintenance can be performed, the timing for starting or completing maintenance of at least a portion of the target mobile objects may be delayed.

In a case in which there is a plurality of target mobile objects, the management apparatus 10 determines the plan for maintenance based on information about each target mobile object. Specifically, the controller 12 of the management apparatus 10 may plan the timing or location for maintenance of each target mobile object based on the information about each target mobile object. In a case in which the timing or location for maintenance of a plurality of target mobile objects overlaps, the controller 12 may determine a plan for maintenance so that the timing or location for maintenance is different. The controller 12 may accelerate or delay the maintenance of at least one target mobile object among a plurality of target mobile objects that have overlapping maintenance times. The controller 12 may move at least one target mobile object among a plurality of target mobile objects that have overlapping maintenance times to another location.

The controller 12 may acquire information about the delivery of the delivery articles 50 by each target mobile object as the information about each target mobile object. The controller 12 may determine a plan for maintenance of each target mobile object based on the information about the delivery of the delivery articles 50 by each target mobile object. The information about the delivery of the delivery articles 50 may, for example, include a delivery schedule for the delivery articles 50, the delivery location or delivery time of the delivery articles 50, or the like.

The controller 12 may acquire information about maintenance items for each target mobile object as the information about each target mobile object. The controller 12 may determine a plan for maintenance of each target mobile object based on the information about the maintenance items for each target mobile object. The maintenance items may, for example, include items for maintenance of a mobile object 40 that is no longer able to travel. The mobile object 40 becomes unable to travel due to failure of the drive unit 44, for example. The maintenance items may include repair of the drive unit 44. The mobile object 40 becomes unable to travel due to lack of remaining battery level or fuel level, for example. The maintenance items may include recharging the battery, refueling, or the like. The maintenance items may, for example, include items for maintenance of a mobile object 40 that is no longer able to store delivery articles 50.

The mobile object 40 becomes unable to store delivery articles 50 due to failure, damage, contamination, or the like of the body 42, for example. The maintenance items may include repair of the body 42.

The controller 12 may acquire the position at which maintenance is required for each target mobile object as the information about each target mobile object. The controller 12 may determine a plan for maintenance of each target mobile object based on the position at which maintenance is required for each target mobile object.

In a case in which the timing or location of maintenance overlaps among a plurality of target mobile objects, the controller 12 may set a priority for maintenance of each target mobile object based on the information about each target mobile object. The controller 12 may determine a plan for maintenance of each target mobile object based on the priority set for each target mobile object. Specifically, the controller 12 may first determine the timing and location for maintenance of a target mobile object for which a high priority was set. The controller 12 may determine the timing or location for maintenance of a target mobile object with low priority to be a timing or location outside of the timing or location for maintenance of a target mobile object with high priority.

The controller 12 may acquire the number of delivery articles 50 being delivered by the target mobile object as the information about the target mobile object. The controller 12 may determine a plan for maintenance of the target mobile object based on the number of delivery articles 50 being delivered. The controller 12 may set a higher priority for the target mobile object as a greater number of delivery articles 50 are being delivered. The delivery articles 50 being delivered may be all of the delivery articles 50 that have been stored by the target mobile object. The delivery article 50 being delivered may be the delivery articles 50, among the delivery articles 50 stored in the target mobile object, whose delivery time is within a predetermined time period.

The controller 12 may acquire the delivery deadline of the delivery article 50 being delivered by the target mobile object as the information about the target mobile object. The controller 12 may determine a plan for maintenance of the target mobile object based on the delivery deadline of the delivery article 50 being delivered. In a case in which a plurality of delivery articles 50 has been stored, the controller 12 may determine a plan for maintenance of the target mobile object based on the closest delivery deadline among the delivery deadlines of each delivery article 50 being delivered. The controller 12 may determine a plan for maintenance of the target mobile object based on the mean or median delivery deadline of the delivery articles 50 being delivered.

The controller 12 may set a priority for maintenance of the target mobile object based on the delivery deadline of the delivery article 50 being delivered. The controller 12 may set a higher priority for the target mobile object as the time until the delivery deadline of the delivery article 50 being delivered is shorter. The controller 12 may set a high priority for a target mobile object that is storing a delivery article 50 whose delivery deadline is within a predetermined time period and may set a low priority for a target mobile object that is not storing a delivery article 50 whose delivery deadline is within a predetermined time period.

The controller 12 may acquire the location at which the target mobile object is stopped as the information about the target mobile object. The controller 12 may determine a plan for maintenance of the target mobile object based on the location at which the target mobile object is stopped. In a case in which the target mobile object is stopped in the corridor of another mobile object 40 and blocks the corridor of the other mobile object 40, for example, the controller 12 may determine a plan for maintenance of the target mobile object so that the target mobile object moves away from the corridor quickly to unblock the corridor. In a case in which the target mobile object is stopped at a location that has a greater impact on the delivery articles 50 being delivered by the target mobile object, for example, the controller 12 may determine a maintenance plan for the target mobile object so that the target mobile object moves away quickly to reduce the impact on the delivery articles 50 being delivered. Locations with a greater impact on the delivery articles 50 may, for example, include locations where the temperature of the target mobile object and the delivery articles 50 is more likely to rise or fall than in a normal environment due to environmental factors such as direct sunlight on the target mobile object. Locations with a greater impact on the delivery articles 50 may, for example, include locations where the delivery articles 50 are more likely to become wet or dirty than in a normal environment due to the target mobile object becoming wet or dirty.

The controller 12 may set a priority for maintenance of the target mobile object based on the location at which the target mobile object is stopped. The controller 12 may set a higher priority for a target mobile object as the number of other mobile objects 40 that are prevented from operating or are affected by the target mobile object is greater. The controller 12 may set a higher priority for a target mobile object as the change in state predicted for the target mobile object is greater. The change in state of the target mobile object may include a change in temperature of the target mobile object or the stored delivery articles 50. The change in state of the target mobile object may include a change in the degree to which the target mobile object or the stored delivery articles 50 are wet or dirty.

The controller 12 may acquire the maintenance items required for the target mobile object as the information about the target mobile object. The controller 12 may determine a plan for maintenance of the target mobile object based on the maintenance items required for the target mobile object. The controller 12 may, for example, determine the plan for maintenance so that maintenance items required to resume operation of a stopped target mobile object are performed with priority over other maintenance items. The controller 12 may, for example, determine the plan for maintenance so that maintenance items required to reduce the impact on the delivery articles 50 are performed with priority over other maintenance items.

The controller 12 may set a completion condition for maintenance required for the target mobile object. For example, in a case in which the target mobile object requires replenishment of energy such as a battery recharge or fuel, the controller 12 may set the condition that the remaining energy level, which represents the battery level or amount of stored fuel, be equal to or greater than a replenishment threshold as the completion condition for maintenance.

The controller 12 may relax the completion condition for the maintenance required for the target mobile object in a case in which the degree of impact on delivery of the delivery article 50 due to the maintenance of the target mobile object is equal to or greater than a predetermined degree. The degree of impact on delivery may, for example, include delays in delivery. The predetermined degree may, for example, be set as a delay time. In a case in which the number of mobile objects 40 in operation has decreased, for example, the controller 12 may relax the completion condition for maintenance required for the target mobile object so that the target mobile object can operate sooner. The controller 12 may relax the completion condition so that the minimum maintenance required for the target mobile object to operate is performed. The controller 12 may determine a plan for maintenance of the target mobile object based on the relaxed completion condition. The controller 12 may relax the completion condition by, for example, reducing the replenishment threshold for evaluating the remaining energy of the target mobile object.

The controller 12 may determine the plan for maintenance by giving priority to a target mobile object that requires less time for maintenance. The controller 12 may set a higher priority for a target mobile object as the time required for maintenance of the target mobile object is shorter. The controller 12 may reduce the time required for maintenance by relaxing the completion requirement to the minimum maintenance required for the target mobile object to operate.

As discussed above, the controller 12 determines the plan for maintenance of each target mobile object based on the information about each target mobile object. The controller 12 may output the determined plan for maintenance to notify the worker who will perform the maintenance. The controller 12 may output the determined plan for maintenance to the terminal apparatus 20 of the user. The terminal apparatus 20 may notify the user by displaying the plan for maintenance. The controller 12 may output the determined plan for maintenance to the equipment that will perform the maintenance.

<Example Procedure for Management Method>

As discussed above, the management apparatus 10 in the management system 1 according to the present embodiment can formulate a plan for maintenance of the mobile object 40 so as to increase the utilization rate of the mobile object 40. The controller 12 of the management apparatus 10 may, for example, perform a management method including the procedures of the flowchart illustrated in FIG. 3. The management method may be implemented as a management program to be executed by the controller 12.

The controller 12 acquires information about the mobile object 40 (step S1). The controller 12 determines whether maintenance of the mobile object 40 is required (step S2). In a case in which maintenance of the mobile object 40 is not required (step S2: NO), the controller 12 proceeds to step S5, described below.

In a case in which maintenance of the mobile object 40 is required (step S2: YES), the controller 12 considers the mobile object 40 as a target mobile object and determines the priority for maintenance of the target mobile object (step S3). The controller 12 may omit the procedure for determining the priority in step S3.

The controller 12 determines the plan for maintenance of the target mobile object based on the information about the target mobile object (step S4). In a case in which the priority for maintenance of the target mobile object was determined by the procedure in step S3, the controller 12 may determine the plan for maintenance of the target mobile object based on the priority.

The controller 12 manages the operation of the mobile object 40 (step S5). In a case in which the plan for maintenance is determined, the controller 12 manages the operation of the mobile object 40 so that maintenance is performed on the target mobile object based on the plan and the delivery articles 50 are delivered by a mobile object 40 other than the target mobile object. After performing the procedure of step S5, the controller 12 ends the execution of the procedure of the flowchart of FIG. 3.

<Summary>

As described above, according to the management system 1, the management apparatus 10, and the management method of the present embodiment, a plan for maintenance of the mobile object 40 is determined based on information about the state of the mobile object 40. The greater the number of mobile objects 40 in operation, the easier it is to satisfy a request from a user for delivery of a delivery article 50. The management apparatus 10 may determine the plan for maintenance of the mobile object so as to increase the number of mobile objects 40 in operation. The longer the mobile object 40 is in operation, the easier it is to satisfy a request from a user for delivery of a delivery article 50. The management apparatus 10 may determine the plan for maintenance of the mobile object 40 so as to increase the operating time of the mobile object 40. The shorter the time that a mobile object 40 with a stored delivery article 50 is stopped, the easier it is to satisfy a request from a user for delivery of the delivery article 50. The management apparatus 10 may determine the plan for maintenance of the mobile object 40 so that the mobile object 40 that is delivering the delivery article 50 resumes operation sooner. In this way, the utilization rate of the mobile object delivering the delivery article 50 can be improved. Consequently, the convenience for the user is improved.

(Other Embodiments)

The controller 12 of the management apparatus 10 treats a mobile object 40 determined to be in a state requiring maintenance as a target mobile object and determines a plan for maintenance of the target mobile object. The controller 12 may set a condition for determining that the mobile object 40 is in a state requiring maintenance based on the number of delivery articles 50 stored by the mobile object 40.

In a case in which the number of delivery articles 50 stored in the mobile object 40 is small, or the time until the delivery deadline for the delivery article 50 stored in the mobile object 40 is long, maintenance of the mobile object 40 has little impact on delivery. By performing maintenance on the mobile object 40 in advance at a time when the impact on delivery is small, the impact of the maintenance of the mobile object 40 on delivery can be reduced for the management system 1 as a whole.

The controller 12 may change the condition for determining that a mobile object 40 is in a state requiring maintenance so that maintenance is performed on mobile objects 40 earlier. For example, the controller 12 may set the condition so that a mobile object 40 is determined to be in a state requiring maintenance even when in a state with a high battery level, fuel level, or the like.

While an embodiment of the present disclosure has been described with reference to the drawings and examples, it is to be noted that various modifications and revisions may be implemented by those skilled in the art based on the present disclosure. Accordingly, such modifications and revisions are included within the scope of the present disclosure. For example, functions or the like included in each step, or the like can be rearranged without logical inconsistency, and a plurality of steps, or the like can be combined into one or divided.

The invention claimed is:

1. A management apparatus comprising a processor configured to:

manage mobile objects that deliver articles;

determine and output a plan for maintenance of at least one target mobile object, which is a mobile object that is out for delivery among the mobile objects and is in a problematic state for delivery, based on information on the at least one target mobile object;

transmit, to the at least one target mobile object, destination information that specifies a destination of the at least one target mobile object, and control information indicating a timing at which to start or stop traveling, and a travel speed; and control a drive unit of the at least one target mobile object to autonomously travel to the destination in accordance with the destination information and the control information, wherein:

the information on the at least one target mobile object includes a location at which the at least one target mobile object is stopped, the processor is configured to determine the plan for maintenance of the at least one target mobile object based on the location at which the at least one target mobile object is stopped, the at least one target mobile object comprises a plurality of target mobile objects, and the processor is configured to determine the plan for maintenance by giving priority to the at least one target mobile object, among the plurality of target mobile objects, that is stopped in a corridor of another mobile object and blocks the corridor of the another mobile object.

2. The management apparatus according to claim 1, wherein;

the processor is further configured to determine a priority for maintenance of each target mobile object based on the information on the at least one target mobile object and determine the plan for maintenance of each target mobile object based on the priority.

3. The management apparatus according to claim 1, wherein:

the information on the at least one target mobile object includes a number of articles being delivered by the at least one target mobile object, and the processor is further configured to determine the plan for maintenance of the at least one target mobile object based on the number of articles being delivered by the at least one target mobile object.

4. The management apparatus according to claim 1, wherein:

the information on the at least one target mobile object includes a delivery deadline of an article being delivered by the at least one target mobile object, and the processor is further configured to determine the plan for maintenance of the at least one target mobile object based on the delivery deadline of the article being delivered by the at least one target mobile object.

5. The management apparatus according to claim 1, wherein;

the processor is further configured to determine the plan for maintenance by giving priority to the at least one target mobile object, among the plurality of target mobile objects, that is stopped at the location that has a greater impact on articles being delivered.

6. The management apparatus according to claim 1, wherein the processor is further configured to determine the plan for maintenance of the at least one target mobile object based on a maintenance item required for the at least one target mobile object.

7. The management apparatus according to claim 1, wherein in a case in which a degree of impact on delivery of articles due to the maintenance of the at least one target mobile object is equal to or greater than a predetermined degree, the processor is further configured to relax a completion condition for the maintenance required for the at least one target mobile object and determine the plan for maintenance of the at least one target mobile object based on the relaxed completion condition.

8. The management apparatus according to claim 7, wherein in a case in which a maintenance item required for the at least one target mobile object is to replenish energy of the at least one target mobile object, the processor is further configured to reduce a replenishment threshold for evaluating a remaining energy of the at least one target mobile object as a completion condition.

9. The management apparatus according to claim 6, wherein the processor is further configured to determine the plan for maintenance by giving priority to the at least one target mobile object that requires less time for maintenance.

10. A management method comprising:
  determining and outputting, by a management apparatus configured to manage mobile objects that deliver articles, a plan for maintenance of at least one target mobile object, which is a mobile object that is out for delivery among the mobile objects and is in a problematic state for delivery, based on information on the at least one target mobile object;
  transmitting, to the at least one target mobile object, destination information that specifies a destination of the at least one target mobile object, and control information indicating a timing at which to start or stop traveling, and a travel speed; and
  controlling a drive unit of the at least one target mobile object to autonomously travel to the destination in accordance with the destination information and the control information, wherein:
  the information on the at least one target mobile object includes a location at which the at least one target mobile object is stopped,
  the management method further includes determining the plan for maintenance of the at least one target mobile object based on the location at which the at least one target mobile object is stopped,
  the at least one target mobile object comprises a plurality of target mobile objects, and
  the management method further includes determining the plan for maintenance by giving priority to the at least one target mobile object, among the plurality of target mobile objects, that is stopped in a corridor of another mobile object and blocks the corridor of the another mobile object.

11. The management method according to claim 10, wherein:
  the management method further comprises:
  determining, by the management apparatus, a priority for maintenance of each target mobile object based on the information on the at least one target mobile object; and
  determining, by the management apparatus, the plan for maintenance of each target mobile object based on the priority.

12. The management method according to claim 10, wherein in the determining of the plan for maintenance of the at least one target mobile object, the plan for maintenance of the at least one target mobile object is determined based on a number of articles being delivered by the at least one target mobile object or a delivery deadline of articles being delivered by the at least one target mobile object.

13. The management method according to claim 10, wherein:
  in the determining of the plan for maintenance of the at least one target mobile object, the plan for maintenance is determined by giving the priority to the at least one target mobile object, among the plurality of target mobile objects, that is stopped at the location that has a greater impact on articles being delivered.

14. The management method according to claim 10, wherein in the determining of the plan for maintenance of the at least one target mobile object, the plan for maintenance of the at least one target mobile object is determined based on a maintenance item required for the at least one target mobile object.

15. The management method according to claim 10, wherein in the determining of the plan for maintenance of the at least one target mobile object, in a case in which a degree of impact on delivery of articles due to the maintenance of the at least one target mobile object is equal to or greater than a predetermined degree, a completion condition for the maintenance required for the at least one target mobile object is relaxed and the plan for maintenance of the at least one target mobile object is determined based on the relaxed completion condition.

16. A non-transitory computer readable medium storing a management program configured to cause a management apparatus that manages mobile objects that deliver articles to:
  determine and output a plan for maintenance of at least one target mobile object, which is a mobile object that is out for delivery among the mobile objects and is in a problematic state for delivery, based on information the at least one target mobile object;
  transmit, to the at least one target mobile object, destination information that specifies a destination of the at least one target mobile object, and control information indicating a timing at which to start or stop traveling, and a travel speed; and
  control a drive unit of the at least one target mobile object to autonomously travel to the destination in accordance with the destination information and the control information, wherein:
  the information on the at least one target mobile object includes a location at which the at least one target mobile object is stopped,
  the management apparatus is configured to determine the plan for maintenance of the at least one target mobile object based on the location at which the at least one target mobile object is stopped,
  the at least one target mobile object comprises a plurality of target mobile objects, and
  the management apparatus is configured to determine the plan for maintenance by giving priority to the at least one target mobile object, among the plurality of target mobile objects, that is stopped in a corridor of another mobile object and blocks the corridor of the another mobile object.

* * * * *